(12) United States Patent
Oto

(10) Patent No.: US 9,939,890 B2
(45) Date of Patent: Apr. 10, 2018

(54) IMAGE GENERATION APPARATUS AND IMAGE GENERATION METHOD OF GENERATING A WIDE VIEWING ANGLE IMAGE

(71) Applicant: Sony Interactive Entertainment Inc., Tokyo (JP)

(72) Inventor: Tomohiro Oto, Tokyo (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 15/320,489

(22) PCT Filed: Jun. 26, 2015

(86) PCT No.: PCT/JP2015/068526
§ 371 (c)(1),
(2) Date: Dec. 20, 2016

(87) PCT Pub. No.: WO2016/002657
PCT Pub. Date: Jan. 7, 2016

(65) Prior Publication Data
US 2017/0160796 A1 Jun. 8, 2017

(30) Foreign Application Priority Data
Jul. 3, 2014 (JP) ................................ 2014-137819

(51) Int. Cl.
*G06F 3/01* (2006.01)
*G06T 15/06* (2011.01)
(Continued)

(52) U.S. Cl.
CPC ............ *G06F 3/012* (2013.01); *A63F 13/211* (2014.09); *A63F 13/332* (2014.09); *A63F 13/35* (2014.09);
(Continued)

(58) Field of Classification Search
CPC .. G06F 3/012; A63F 2300/105; A63F 13/332; A63F 13/211; A63F 13/428;
(Continued)

(56) References Cited

U.S. PATENT DOCUMENTS 6,317,127 B1 11/2001 Daily
7,495,638 B2 2/2009 Lamvik
(Continued)

FOREIGN PATENT DOCUMENTS

EP 0838787 A2 4/1998
JP 01252993 A 10/1989
(Continued)

OTHER PUBLICATIONS

International Preliminary Report on Patentability and Written Opinion for corresponding PCT Application No. PCT/JP2015/068526, 16 pages, dated Jan. 12, 2017.
(Continued)

*Primary Examiner* — Maurice L McDowell, Jr.
(74) *Attorney, Agent, or Firm* — Matthew B. Dernier, Esq.

(57) ABSTRACT

A panorama image processing unit generates a wide viewing angle image like a panorama image which is seen from a given point of view. An image conversion unit converts the generated wide viewing angle image into an image of a transmission format in which the angular resolution which is a number of pixels per unit angle centered at the point of view is adjusted in response to a ray direction toward the point of view. An image provision unit transmits the image in the transmission format in which the angular resolution is adjusted to a head-mounted display unit. The head-mounted display unit converts the received image so as to conform the image to an optical characteristic of a device and displays the image on the device.

8 Claims, 12 Drawing Sheets

(51) Int. Cl.
  *G06T 3/00* (2006.01)
  *G06T 19/20* (2011.01)
  *G06T 15/20* (2011.01)
  *A63F 13/35* (2014.01)
  *A63F 13/332* (2014.01)
  *A63F 13/428* (2014.01)
  *A63F 13/211* (2014.01)

(52) U.S. Cl.
  CPC .......... *A63F 13/428* (2014.09); *G06T 3/0018* (2013.01); *G06T 15/06* (2013.01); *G06T 15/20* (2013.01); *G06T 19/20* (2013.01); *A63F 2300/105* (2013.01); *A63F 2300/6045* (2013.01); *G06T 2215/16* (2013.01); *G06T 2219/2016* (2013.01)

(58) Field of Classification Search
  CPC .. A63F 13/35; A63F 2300/6045; G06T 15/06; G06T 3/0018; G06T 19/20; G06T 15/20; G06T 2215/16; G06T 2219/2016
  See application file for complete search history.

(56) References Cited

U.S. PATENT DOCUMENTS 9,316,834 B2    4/2016   Makino
2014/0266990 A1  9/2014   Makino
2015/0163473 A1  6/2015   Osawa

FOREIGN PATENT DOCUMENTS

| | | |
|---|---|---|
| JP | 04293375 A | 10/1992 |
| JP | 05108036 A | 4/1993 |
| JP | 10243310 A | 9/1998 |
| WO | 2013076994 A1 | 5/2013 |
| WO | 2014010157 A1 | 1/2014 |

OTHER PUBLICATIONS

International Search Report for corresponding PCT Application No. PCT/JP2015/068526, 4 pages, dated Sep. 5, 2015.

Office Action for corresponding JP Patent Application No. 2014-137819, 7 pages, dated Sep. 8, 2015.

Extended European Search Report for corresponding EP Application No. 15815602.6, 11 pages, dated Feb. 16, 2018.

Howlett E M Ed—Society for Information Display: "A Wide-Fiel-Of View High-Resolution Compact Virtual-Reality Display". SID International Symposium Digest of Papers. Playa Del Rev. SID. US. Vol. 23. pp. 73-76, (May 17, 1992).

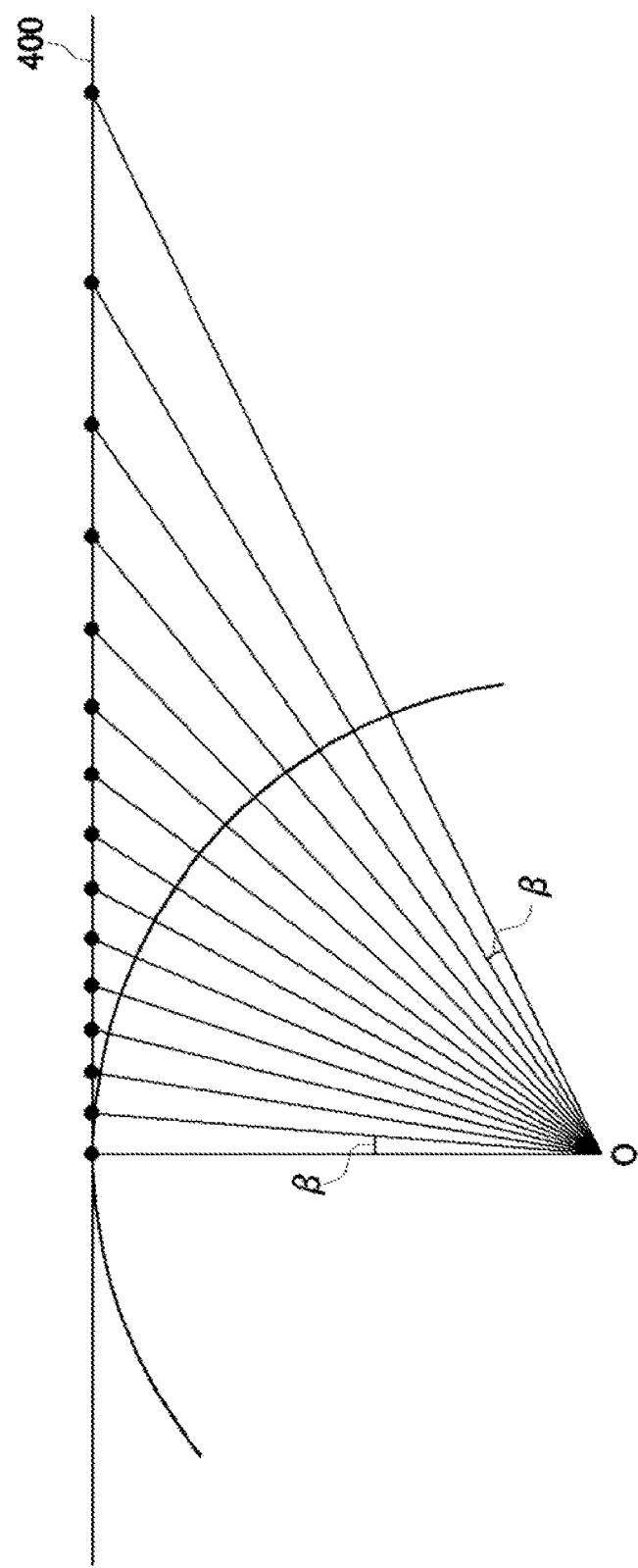

(a)

(b)

IMAGE GENERATION APPARATUS AND IMAGE GENERATION METHOD OF GENERATING A WIDE VIEWING ANGLE IMAGE

TECHNICAL FIELD

The present invention relates to an apparatus for and a method of generating a wide viewing angle image.

BACKGROUND ART

It is practiced that an HMD (Head-Mounted Display) unit connected to a game machine is mounted on the head of a user to allow the user to operate a controller or the like to play a game while viewing a screen image displayed on the head-mounted display unit. In an ordinary stationary type display unit connected to a game machine, the visual field range of the user spreads also to the outer side of a screen image of the display unit, and therefore, the user may not concentrate on the screen image of the display unit or sometimes lacks in immersive experience in the game. In this regard, where a head-mounted display unit is mounted on a user, since the user does not view any other than a video displayed on the head-mounted display unit, there is an effect that the immersive experience in the video world is enhanced and the entertainment value of the game is enhanced further.

Further, if a panorama image is displayed on a head-mounted display unit such that, if a user who wears the head-mounted display unit rotates the head, then a panorama image or a virtual space over 360 degrees is displayed, then the immersive experience in the video is further enhanced and also the operability of an application such as a game is improved.

SUMMARY

Technical Problem

In a head-mounted display device which displays an image of a wide viewing angle, since it is physically difficult to achieve a configuration by which distortion of an optical system such as a lens in the device is removed fully, the correspondence relationship between the displayed position of each pixel of an image display unit in the device and the displayed position of a viewer passed through the optical system frequently becomes nonlinear. In particular, since the correspondence relationship described above differs among different head-mounted display devices due to a difference in characteristic of the optical system, in order to generate an image suitable for each individual head-mounted display unit, image conversion which is different among the different devices is required.

At present, a system is adopted in which the image generation apparatus side such as a game machine or a personal computer generates an image in a format suitable for a characteristic of a head-mounted display device and transfers the generated image to the head-mounted display unit. Simply speaking, the image generation apparatus side directly generates an image to be displayed on a panel of a particular head-mounted display unit. However, with the system described, as the number of types of head-mounted display devices increases from now on, it becomes necessary for the image generation apparatus side to generate an image individually in accordance with each individual head-mounted display unit, and it becomes difficult to deal.

Although several vendors who provide head-mounted display units are available at present, since an image transmission format common to head-mounted display units is not available, it is the present situation that an image must be generated in accordance with a characteristic of each individual head-mounted display device.

On the other hand, if a wide viewing angle image such as a panorama image generated by the image generation apparatus side is compressed as it is and transmitted and then it is converted in accordance with an optical characteristic and displayed by the head-mounted display unit side, a deviation occurs in angular resolution depending upon the direction of a ray of light advancing toward a point of view, and the apparent picture quality is deteriorated in a central region of the image. This is a phenomenon which occurs when an image whose resolution is uniform over the overall screen image is viewed in a wide viewing angle, and may become a problem not only with a head-mounted display unit but also with a display unit of the horizontally elongated or vertically elongated type.

The present invention has been made in view of such a problem as just described, and it is an object of the present invention to provide an image generation apparatus and an image generation method which are capable of generating a wide viewing angle image suitable for displaying by a head-mounted display unit and so forth.

Solution to Problem

In order to solve the problem described above, an image generation apparatus according to an aspect of the present invention includes an image generation unit configured to generate an image which is seen from a given point of view, and an image conversion unit configured to convert the generated image into an image of a transmission format in which an angular resolution which is a number of pixels per unit angle centered at the point of view is adjusted in response to a ray direction toward the point of view.

Also another aspect of the present invention is an image generation apparatus. The apparatus includes a ray tracing unit configured to trace, in a reverse direction, a ray of light directed toward a given point of view to render an image. The ray tracing unit generates an image in a transmission format in which an angular resolution which is a number of pixels per unit angle centered at the point of view is adjusted in response to a ray direction toward the point of view.

A further aspect of the present invention is an image generation method. The method includes an image generation step of generating an image which is seen from a given point of view, and an image conversion step of converting the generated image into an image of a transmission format in which an angular resolution which is a number of pixels per unit angle centered at the point of view is adjusted in response to a ray direction toward the point of view.

Also a still further aspect of the present invention is an image generation method. The method includes a ray tracing step of tracing, in a reverse direction, a ray of light entering a given point of view to render an image. The ray tracing step generates an image in a transmission format in which an angular resolution which is a number of pixels per unit angle centered at the point of view is adjusted in response to a ray direction toward the point of view.

It is to be noted that also an arbitrary combination of the components described above and results of conversion of the representation of the present invention between a method, an apparatus, a system, a computer program, a data structure, a recording medium and so forth are effective as modes of the present invention.

Advantageous Effect of Invention

According to the present invention, a wide viewing angle image suitable for displaying on a head-mounted display unit or the like can be generated.

BRIEF DESCRIPTION OF DRAWINGS

FIG. 6B is a view illustrating an image format in which pixels are disposed such that the angular resolution is uniformized irrespective of the ray direction toward the point of view.

DESCRIPTION OF EMBODIMENT

Figure 1:
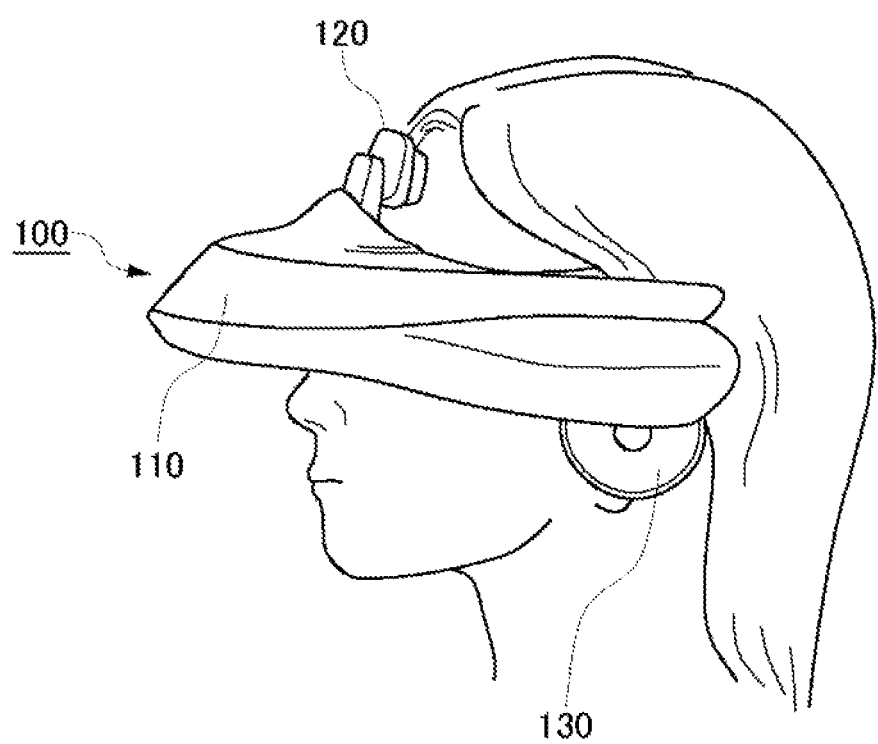
FIG. 1 is an appearance view of a head-mounted display unit.

FIG. 1 is an appearance view of a head-mounted display unit 100. The head-mounted display unit 100 includes a main body unit 110, a front head portion contact unit 120, and a side head portion contact unit 130.

The head-mounted display unit 100 is a display apparatus which is mounted on the head of a user such that the user appreciates a still picture or a moving picture displayed on a display unit and listens to sound, music or the like outputted from a headphone.

Position information of a user can be measured by a position sensor such as a GPS (Global Positioning System) apparatus built in or externally mounted on the head-mounted display unit 100. Further, posture information such as a rotational angle or an inclination of the head of the user, who wears the head-mounted display unit 100, can be measured by a posture sensor built in or externally mounted on the head-mounted display unit 100.

The main body unit 110 includes the display unit, a position information acquisition sensor, the posture sensor, a communication apparatus and so forth. The front head portion contact unit 120 and the side head portion contact unit 130 may have, as optional parts, biological information acquisition sensors which can measure biological information such as the body temperature, pulse rate, blood components, sweating, brain waves and cerebral blood flow of the user.

The head-mounted display unit 100 may further include a camera for picking up an image of the eyes of the user. By the camera incorporated in the head-mounted display unit 100, the line of sight, the movement of the pupils, a blink of the eyes and so forth of the user can be detected.

Here, a generation method of an image to be displayed on the head-mounted display unit 100 is described. The image generation method of the present embodiment can be applied not only to the head-mounted display unit 100 in a narrow sense but also to a case in which glasses, an eyeglass-type display unit, an eyeglass type camera, a headphone, a headset (headphone with a microphone), an earphone, an earring, an ear camera, a cap, a cap with a camera, a hairband or the like is mounted.

Figure 2:
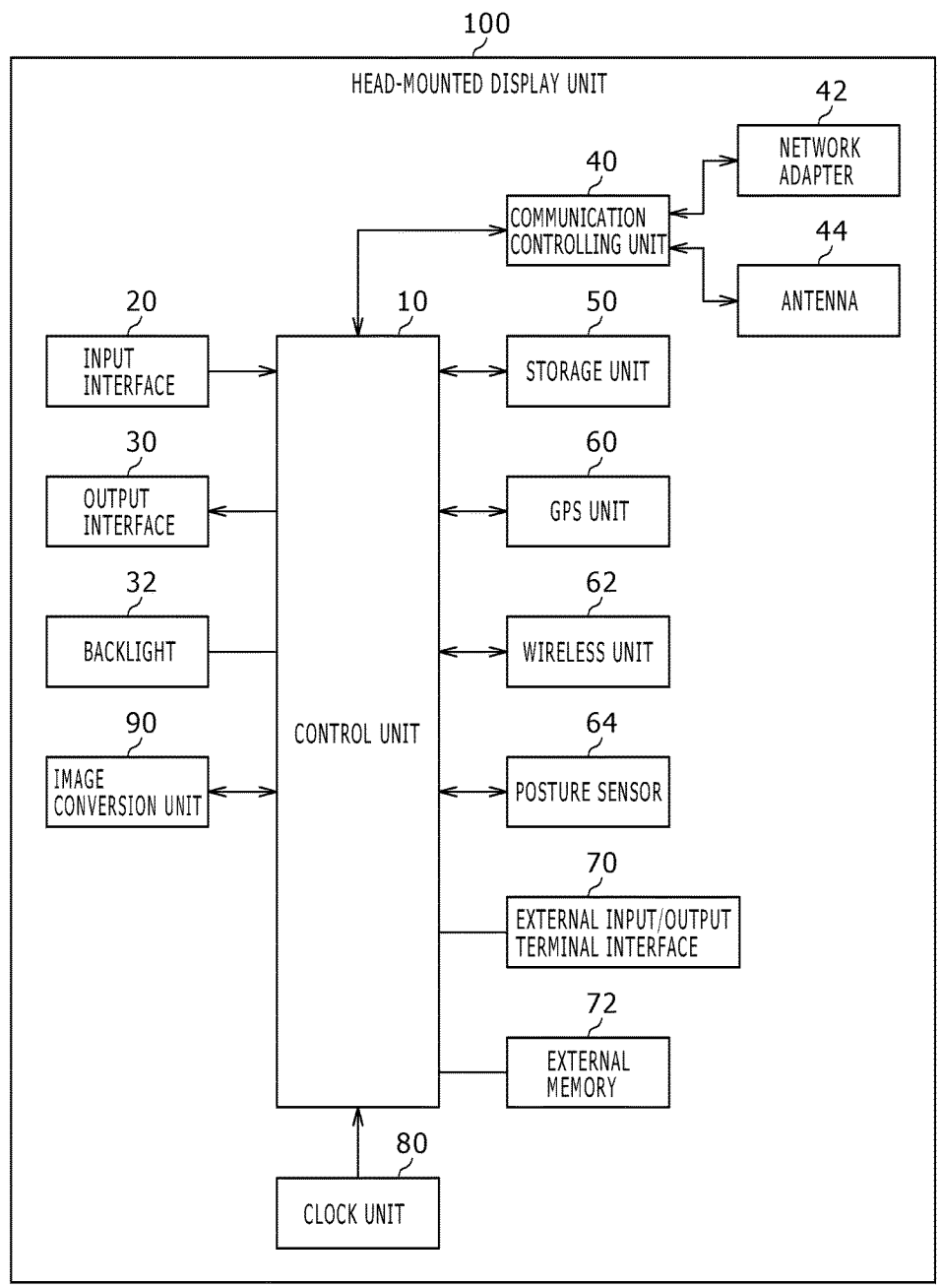
FIG. 2 is a functional block diagram of the head-mounted display unit.

FIG. 2 is a functional block diagram of the head-mounted display unit 100.

A control unit 10 is a main processor which processes and outputs a signal such as an image signal or a sensor signal, an instructions or data. An input interface 20 accepts an operation signal or a setting signal from a touch panel and a touch panel controller and supplies the accepted signal to the control unit 10. An output interface 30 receives an image signal from the control unit 10 and causes the display unit to display the received image signal. A backlight 32 supplies backlight to a liquid crystal display unit.

A communication controlling unit 40 transmits data inputted thereto from the control unit 10 to the outside by wire or wireless communication through a network adapter 42 or an antenna 44. Further, the communication controlling unit 40 receives data from the outside by wire or wireless communication through the network adapter 42 or the antenna 44 and outputs the data to the control unit 10.

A storage unit 50 temporarily stores data, a parameter, an operation signal and so forth to be processed by the control unit 10.

A GPS unit 60 receives position information from GPS satellites and supplies the position information to the control unit 10 in accordance with an operation signal from the control unit 10. A wireless unit 62 receives position information from a wireless base station and supplies the position information to the control unit 10 in accordance with an operation signal from the control unit 10.

A posture sensor 64 detects posture information such as a rotational angle or an inclination of the main body unit 110 of the head-mounted display unit 100. The posture sensor 64 is implemented by a suitable combination of a gyro sensor, an acceleration sensor, an angular acceleration sensor and so forth.

An external input/output terminal interface 70 is an interface for connecting a peripheral apparatus such as a USB (Universal Serial Bus) controller. An external memory 72 is an external memory such as a flash memory.

A clock unit 80 sets time information in response to a setting signal from the control unit 10 and supplies time data to the control unit 10.

In the head-mounted display unit 100, only if an image is displayed on a display panel placed right in front of the user's eyes, the image exhibits an out-of-focus state and looks blurred. Therefore, an optical system such as a prism and a lens is used such that the image can be viewed over a wide viewing angle without distortion. An image conversion unit 90 receives an image signal from the control unit 10, coverts the image signal in accordance with a distortion characteristic of the optical system of the head-mounted display unit 100 and returns the image signal after the conversion to the control unit 10.

The control unit 10 can supply an image or text data to the output interface 30 to cause the display unit to display the image or text data thereon or can supply an image or text data to the communication controlling unit 40 so as to transmit the image or text data to the outside.

Figure 3:
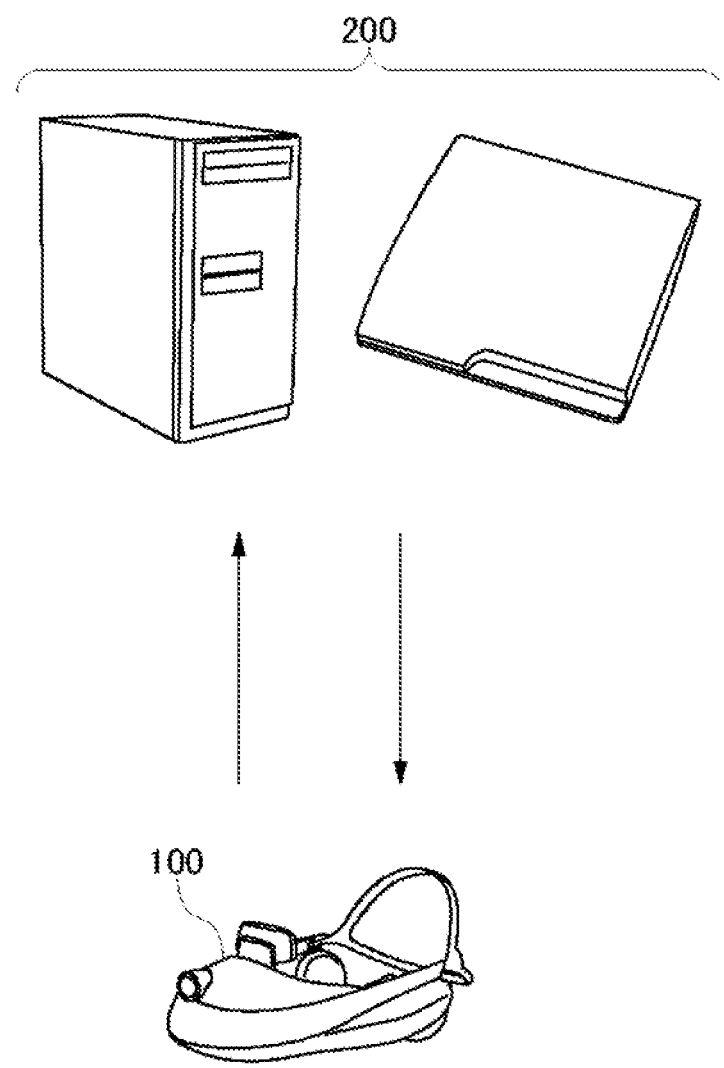
FIG. 3 is a view depicting a configuration of a panorama image generation system according to an embodiment.

FIG. 3 is a view depicting a configuration of a panorama image generation system according to an embodiment. The head-mounted display unit 100 is connected to a game machine 200 by an interface such as wireless communication or a USB which connects a peripheral apparatus. The game machine 200 may further be connected to a server by a network. In this case, the server may provide an online application such as a game in which a plurality of users can participate through the network to the game machine 200. The head-mounted display unit 100 may be connected to a computer or a portable terminal in place of the game machine 200.

Figure 4:
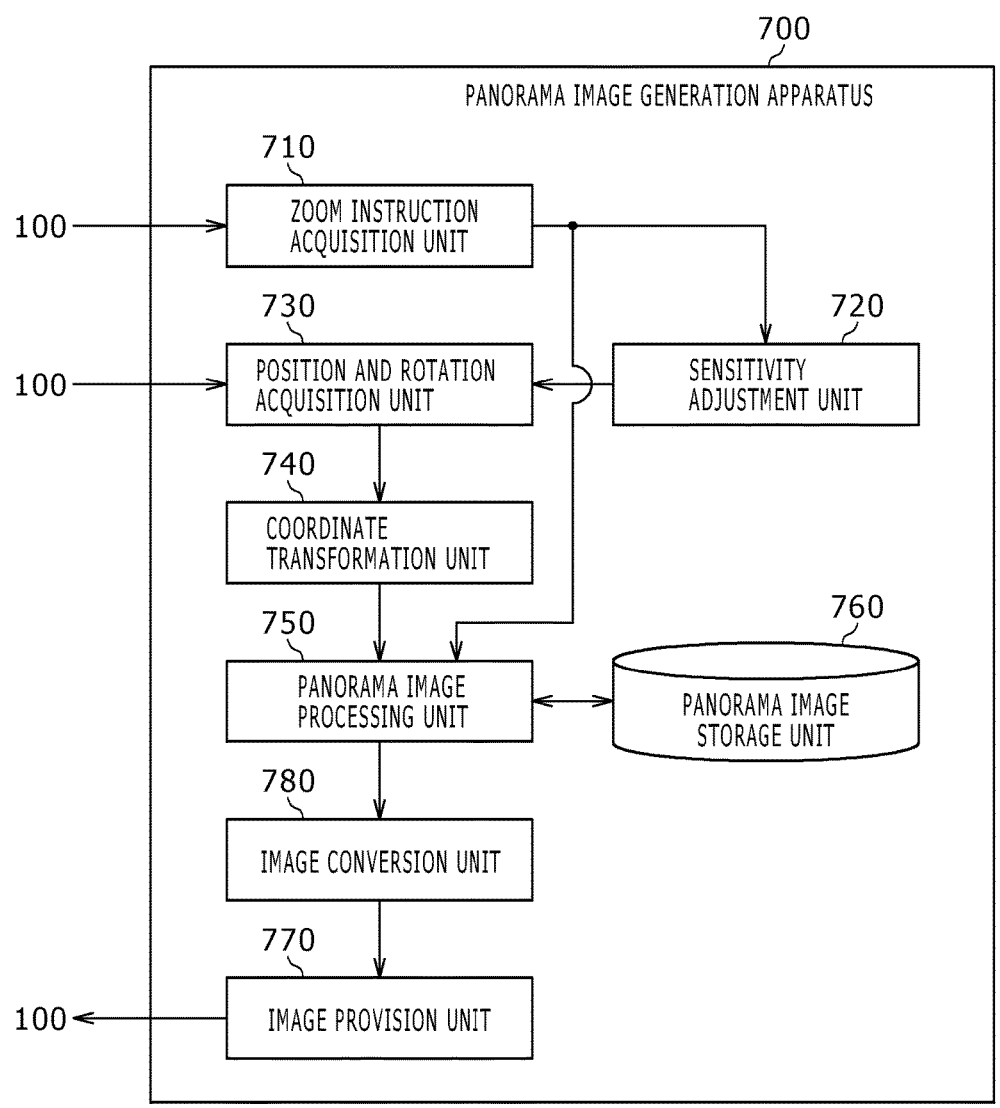
FIG. 4 is a functional block diagram of a panorama image generation apparatus according to the embodiment.

FIG. 4 is a functional block diagram of a panorama image generation apparatus 700 according to the present embodiment. FIG. 4 depicts a block diagram focusing on functions, and the functional blocks can be implemented in various forms only from hardware, only from software or from a combination of them.

The panorama image generation apparatus 700 is mounted on the game machine 200 to which the head-mounted display unit 100 is connected. However, at least part of the functions of the panorama image generation apparatus 700 may be incorporated in the control unit 10 of the head-mounted display unit 100. In particular, a function of an image conversion unit 780 hereinafter described may be incorporated in the head-mounted display unit 100 side. Alternatively, part of the functions of the panorama image generation apparatus 700 may be incorporated in the server connected to the game machine 200 through the network.

A zoom instruction acquisition unit 710 acquires a magnification of zooming designated by the user through the input interface 20 of the head-mounted display unit 100. The zoom magnification acquired by the zoom instruction acquisition unit 710 is supplied to a sensitivity adjustment unit 720 and a panorama image processing unit 750.

A position and rotation information acquisition unit 730 acquires information relating to the position and rotation of the head of the user who wears the head-mounted display unit 100 on the basis of position information detected by the GPS unit 60 or a motion sensor of the head-mounted display unit 100 and posture information detected by the posture sensor 64. The position of the head of the user may be acquired by detecting a movement of the head-mounted display unit 100 by the camera of the game machine 200.

The position and rotation information acquisition unit 730 acquires the position and rotation of the head of the user on the basis of a sensitivity designated by the sensitivity adjustment unit 720. For example, if the user rotates the neck, also a variation in angle of the head of the user is detected by the posture sensor 64. However, the sensitivity adjustment unit 720 instructs the position and rotation information acquisition unit 730 to ignore the detected variation in angle until after the variation in angle exceeds a predetermined value.

Further, the sensitivity adjustment unit 720 adjusts the sensitivity of the angle detection of the head on the basis of the zoom magnification acquired from the zoom instruction acquisition unit 710. As the zoom magnification increases, the sensitivity of the angle detection of the head decreases. Since zooming decreases the angle of view, vibration of a display image by shaking of the head can be suppressed by lowering the angle detection sensitivity of the head.

As the motion sensor, a combination of at least one or more of a 3-axis geomagnetic sensor, a 3-axis acceleration sensor and a 3-axis gyro (angular velocity) sensor may be used to detect a movement of the head of the user in the forward and rearward directions, leftward and rightward directions and upward and downward directions. Alternatively, different pieces of position information of the head of the user may be combined to improve the accuracy in movement detection of the head.

A coordinate transformation unit 740 uses a position and rotation of the head-mounted display unit 100 acquired by the position and rotation information acquisition unit 730 to perform coordinate transformation for generating an image to be displayed on the head-mounted display unit 100 with a tracing function.

The panorama image processing unit 750 reads out panorama image data from a panorama image storage unit 760, generates a panorama image corresponding to the position and rotation of the head-mounted display unit 100 by a zoom magnification designated by the zoom instruction acquisition unit 710 in accordance with the coordinate transformation by the coordinate transformation unit 740, and provides the generated panorama image to the image conversion unit 780. Here, the panorama image data may be a moving picture or still picture content generated in advance or may be rendered computer graphics.

The image conversion unit 780 converts the format of the wide viewing angle image generated by the panorama image processing unit 750 into a transmission format suitable for a characteristic of the eyes of the user.

In the case of a general HDTV (High-Definition Television), the horizontal angle of view is approximately 33 degrees. However, in the case where a wide viewing angle image like a panorama image is to be displayed on the head-mounted display unit 100 or the like, a horizontal angle of view greater than 90 degrees is demanded. If the angle of view increases from 40 degrees to 100 degrees for an image of the same resolution, the pixel density decreases and the resolution (dpi: dots per inch) in a central region of an image decreases to approximately 1/3.2 time.

In particular, when a user who wears the head-mounted display unit 100 views a panorama image of a wide viewing angle, the angular resolution is a significant factor which affects the quality of the image. The "angular resolution" is a pixel number per unit angle centered at the point of view. In the case of the head-mounted display unit 100 which displays a horizontally elongated image like a panorama image, a deviation appears in an angular resolution depending upon the ray direction toward the point of view.

The image conversion unit 780 adjusts the angular resolution in accordance with a characteristic of the eyes of the user to convert an image into an image of a "wide viewing angle image transmission format" suitable for viewing a panorama image of a wide viewing angle on the head-mounted display unit 100. Details of the image conversion process are hereinafter described.

The image conversion unit 780 provides the image of the wide viewing angle image transmission format obtained by the conversion in this manner to an image provision unit 770. The image provision unit 770 supplies the panorama image data obtained by the conversion by the image conversion unit 780 to the head-mounted display unit 100.

Figure 5:
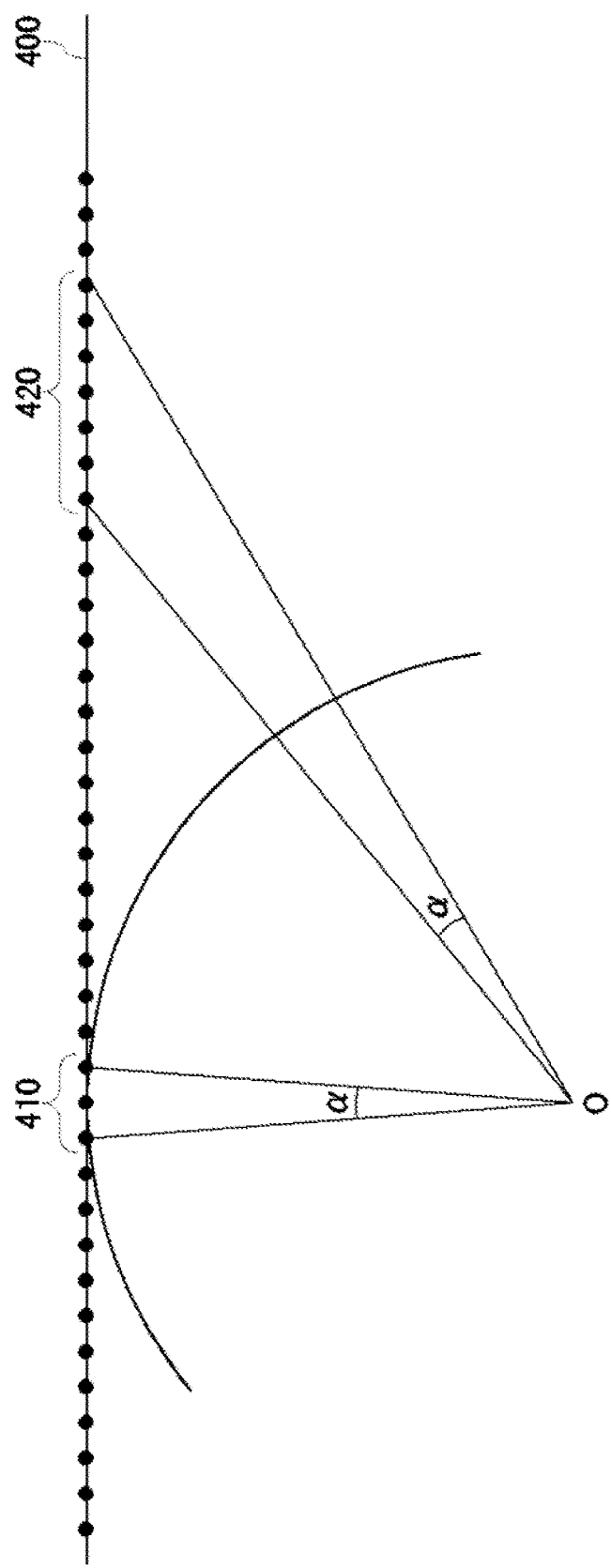
FIG. 5 is a view illustrating an angular resolution of an image displayed on a display plane.

FIG. 5 is a view illustrating an angular resolution of an image displayed on a display plane. In FIG. 5, a pixel displayed on a display plane 400 is schematically indicated by a black point.

When an image displayed on the display plane 400 is viewed from the point O of view, dispersion occurs with the pixel density depending upon the direction of a ray of light entering the point O of view. Although the number of pixels corresponding to a small angle $\alpha$ of a ray direction from a directly opposite position toward the point O of view is three as indicated by reference numeral 410, the number of pixels corresponding to the small angle $\alpha$ of a ray direction from an obliquely right position toward the point O of view is seven as indicated by reference numeral 420. In this manner, when an image having pixels disposed at equal distances on the display plane 400 is viewed from the point O of view, the angular resolution in the direction from the directly opposite position is lowest, and the angular resolution increases toward a direction displaced horizontally from the directly opposite direction. In particular, when a panorama image of a wide viewing angle is viewed on the head-mounted display unit 100, the difference between the angular resolution in an oblique lateral direction and the angular resolution in the direction from the directly opposite position becomes remarkable. Although originally a human being mainly recognizes a ray of light from the directly opposite direction (central region of an image) but does not recognize a ray of light from an oblique direction (peripheral region of the image) very much, it is inconvenient that the angular resolution in a central region of an image is lower than the angular resolution of a peripheral region of the image.

In the present embodiment, a common transmission format which does not rely upon a head-mounted display device is defined between the panorama image generation apparatus 700 and each individual head-mounted display unit 100, and either the panorama image generation apparatus 700 directly generates an image in the common transmission format or a generated image is converted into an image of the common transmission format. Then, the image of the common transmission format is transmitted to each individual head-mounted display unit 100. Each individual head-mounted display unit 100 converts an image of the common transmission format received from the panorama image generation apparatus 700 into an image of a format suitable for an optical characteristic of each device to display the converted image on the display panel. The panorama image generation apparatus 700 can generate an image without recognizing a difference of a head-mounted display device by using the common transmission format which does not rely upon the device. Therefore, the necessity to individually deal with individual head-mounted display units having different optical characteristics is eliminated.

Further, in the present embodiment, as the common transmission format suitable to display a wide viewing angle image on the head-mounted display unit 100, a "wide viewing angle image transmission format" in which the angular resolution is adjusted in accordance with the characteristic of the eyes of the user is adopted. Here, as an example of adjustment of the angular resolution in accordance with the characteristic of the eyes of the user, a wide viewing angle image transmission format in which the angular resolution is adjusted in response to a ray direction toward the point of view is described. More particularly, a transmission format in which the angular resolution is adjusted so as to be uniform irrespective of a ray direction toward the point of view is described first.

Figure 6A:
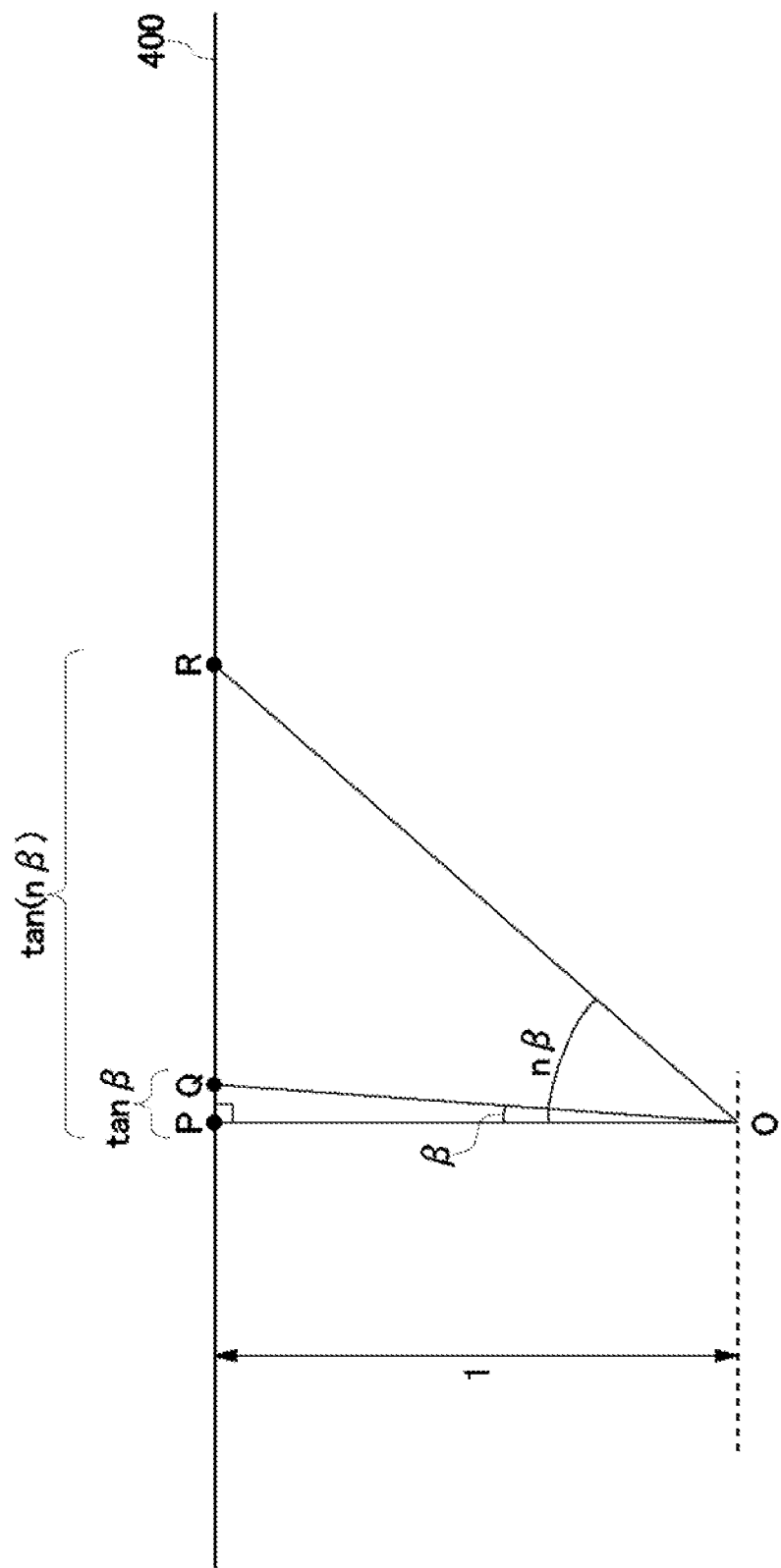
FIG. 6A is a view illustrating a relationship in position between a ray direction toward a point of view and a pixel on the display plane.

FIG. 6A is a view illustrating a relationship of a ray direction toward the point of view and a position of a pixel on the display plane. The distance from the point O of view to the display plane 400 is assumed to be 1. A pixel when the display plane 400 is viewed directly opposite from the point O of view is represented by P. A pixel on the display plane 400 existing in a ray direction of an angle $\beta$ with respect to the directly opposite position is represented by Q. The pixel Q is positioned at a distance of $\tan \beta$ from the pixel P on the display plane 400.

A pixel on the display plane 400 existing in a ray direction of an angle $n\beta$ (n is a natural number) with respect to the directly opposite position is represented by R. The pixel R is positioned at a distance of $\tan(n\beta)$ from the pixel P on the display plane 400. If the pixels are not disposed at equal distances on the display plane 400 but are disposed at positions on the display plane 400 spaced by the distances of $\tan \beta$, $\tan 2\beta$, $\tan 3\beta$, . . . from the pixel P, the angular resolution can be made uniform irrespective of the ray direction toward the point O of view.

FIG. 6B is a view illustrating an image format in which pixels are disposed such that the angular resolution becomes uniform irrespective of the ray direction toward the point of view. In FIG. 6B, since a pixel is disposed at a position on the display plane 400 indicated by $\tan(n\beta)$ (n is a natural number) for each angle $\beta$, the angular resolution (pixel number per unit angle) can be made uniform in any ray direction toward the point O of view.

Figure 7A:
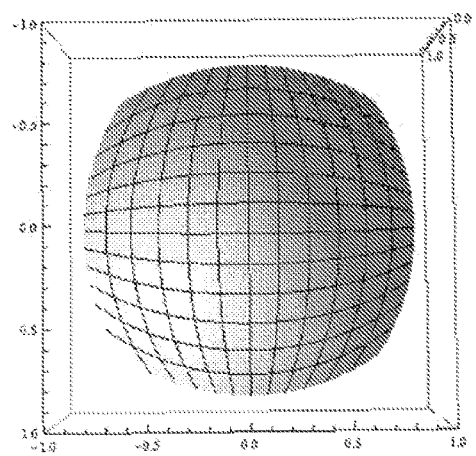
FIG. 7A is a view illustrating a normalization format in which the angular resolution is uniformized irrespective of the ray direction toward the point of view.
Figure 7B:
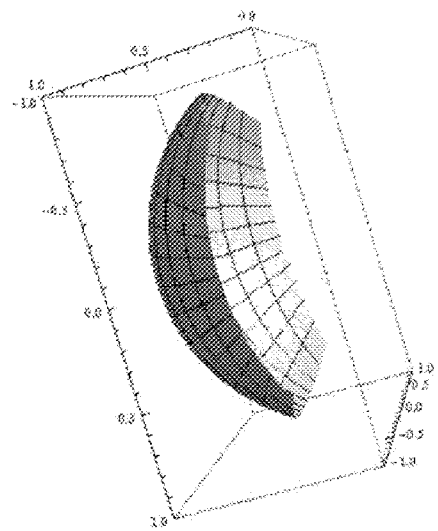
FIG. 7B is a view illustrating the normalization format in which the angular resolution is uniformized irrespective of the ray direction toward the point of view.

FIGS. 7A and 7B are views illustrating, as an example of the wide viewing angle image transmission format, a normalization format in which the angular resolution is made uniform irrespective of the ray direction toward the point of view.

Although, in an ordinary television set or display unit, color information of a pixel at a position of a panel at which light is to be emitted is transmitted, in the wide viewing angle image transmission format, color information of a pixel existing in a ray direction toward the point of view is transmitted. Here, the position of the point of view is represented by (0, 0, 0), and the horizontal direction, vertical direction and forward and rearward direction are taken as X axis, Y axis and Z axis, respectively. Further, the front direction is taken as a positive direction of the Z axis. It is assumed that pixels (X, Y) of a generated image are juxtaposed at equal distances. Further, a resolution and an angle of view in each of the horizontal direction and the vertical direction are set to values unique to the panel device and are determined independently of the transmission format of an image.

In a transmission format of an image conventionally used generally and widely, a displayed position of a pixel is determined assuming that the pixels (X, Y) are in a ray direction (X, Y, 1) toward the point of view, and pixels are displayed at equal distances.

However, in the conventional transmission format, the angular resolution in a central region of an image becomes lower than the angular resolution at a peripheral region of the image, and therefore, the conventional transmission format is not optimum as a transmission format for display on a head-mounted display unit of a wide viewing angle. Therefore, the angular resolution is adjusted in response to the ray direction toward the point of view by nonlinearly scaling the X axis and the Y axis of pixels to determine graduations. As an example, in order to make the angular resolution fixed irrespective of the ray direction toward the point of view, coordinates of a pixel are taken not by (X, Y) but by (tan(X), tan(Y)).

When a pixel which is ith in the X direction and jth in the Y direction is to be generated, in an ordinary image format, a pixel at the coordinates (X, Y) given by $$X = X\text{scale} \times i + X\text{offset}$$

$$Y = Y\text{scale} \times j + Y\text{offset}$$

is generated. However, in the normalization format, a pixel at the coordinates of (tan(X), tan(Y)) is generated. This signifies that light of a pixel which is emitted on the display plane enters the point O of view from the ray direction (tan(X), tan(Y), 1).

In this manner, an image of the ordinary format is converted into an image of the normalization format in which pixels are disposed at positions of (tan(X), tan(Y)). As a result, in the normalization format, the disposition of pixels on the display plane exhibits a high pixel density in a central region of the image but exhibits a low pixel density in a peripheral region of the image as depicted in FIG. 6B. However, the angular resolution becomes uniform irrespective of the ray direction toward the point of view. When an image transmitted in the normalization format is to be displayed on the head-mounted display unit 100, the pixel at the ith in the X direction and the jth in the Y direction may be displayed at a position indicated by the coordinates (tan(X), tan(Y)) of the display plane.

FIGS. 7A and 7B stereoscopically illustrate transformation into the normalization format and depict a spherical surface of a radius 1 centered at the point O of view in FIG. 6B. However, in the transformation into the normalization format, since z=1, only an image which spreads over 180 degrees in the horizontal direction in front of the point O of view can be represented. In order to allow z to have a negative value such that an image behind the point O of view exceeding 180 degrees in the horizontal direction can be represented, all of the coordinate values may be multiplied by cos(X)cos(Y) such that the ray direction of a pixel may be represented by (sin(X)cos(Y), cos(X)sin(Y), cos(X)cos(Y)). It is to be noted that attention is to be paid to the fact that, according to the normalization format, an image of an angle exceeding 180 degrees in the vertical direction cannot be represented because a singular point exists at 90 degrees in the upward and downward directions.

Figure 8A:
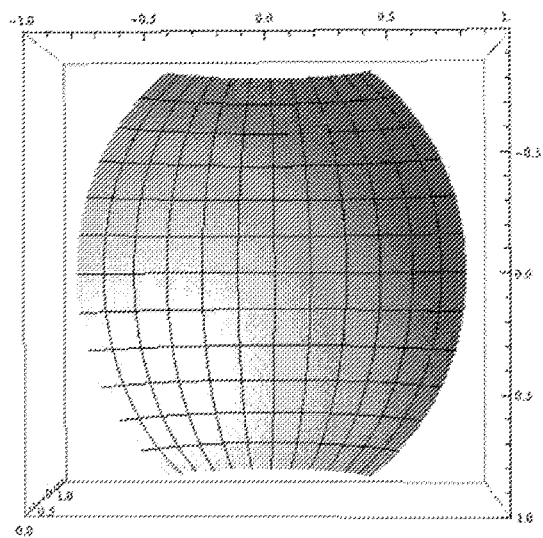
FIG. 8A is a view illustrating a different example of the normalization format in which the angular resolution is uniformized irrespective of the ray direction toward the point of view.
Figure 8B:
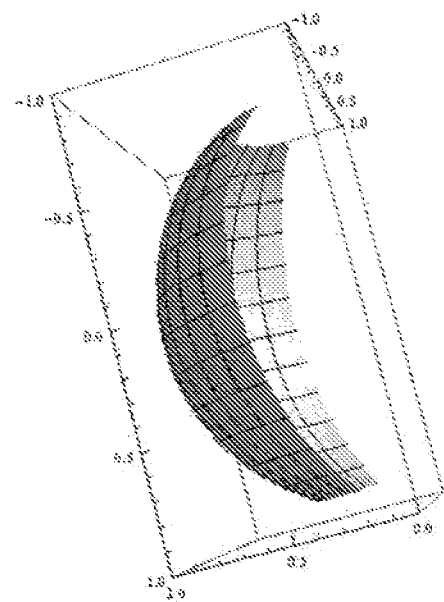
FIG. 8B is a view illustrating the different example of the normalization format in which the angular resolution is uniformized irrespective of the ray direction toward the point of view.

FIGS. 8A and 8B are views illustrating a different example of the normalization format in which the angular resolution is made uniform irrespective of the ray direction toward the point of view.

The normalization format uses an angle corresponding to a latitude and a longitude such that an image over 360 degrees in the horizontal direction and 180 degrees in the vertical direction can be displayed. In particular, a format of an image is defined assuming that light of a pixel is directed to the point O of view from a ray direction (sin(X)cos(Y), sin(Y), cos(X)cos(Y)). This is same as the ray direction (tan(X), tan(Y)/cos(X), 1) except the singular points and the directionality. Since this format has the singular points at 90 degrees at the top and the bottom, it is a format suitable for a panorama image which ranges smaller than 180 degrees in the heightwise direction and more than 180 degrees in the horizontal direction. Naturally, this format can be used even if the range of an image does not exceed 180 degrees in the horizontal direction. It is said that, when a human being views with both eyes, the angle of view exceeds 180 degrees in the leftward and rightward directions, and a format by which an image exceeding 180 degrees in the horizontal direction can be represented is advantageous particularly to a panorama image.

In the foregoing description, the image transmission format normalized such that the angular resolution (number of pixels per unit angle centered at the point of view) is uniformized is defined. However, an image transmission format may be defined in which, taking it into consideration that principally a central region of an image (portion which is seen in a directly opposite direction) is seen in a field of view of a human being while a peripheral region of the image (portion which is seen in an oblique direction) is not seen much (is not recognized), the angular resolution is adjusted in response to the ray direction such that the angular resolution in a central region is set high while the angular resolution in a peripheral region is set low. Alternatively, a transmission format may be defined in which the adjustment method of the angular resolution corresponding to the ray direction can be designated using a parameter.

The transmission format in which a function including a parameter is used is described. In the normalization format in which the angular resolution is uniformized irrespective of the ray direction toward the point of view described hereinabove with reference to FIGS. 7A and 7B as a transmission format for decreasing the resolution in a peripheral region in comparison with a central region of an image, the ray direction of a pixel is represented by (tan(X), tan(Y), 1). In the transmission format defined by a parameter function, the ray direction is represented by (sin(X)/(cos(X))$^{P1}$), sin(Y)/(cos(Y)$^{P2}$), 1).

P1 and P2 are parameters effective in the horizontal direction and the vertical direction, respectively, and where the value of P1 and P2 is 1, the pixel density is uniform irrespective of the ray direction. However, where the value of P1 and P2 is higher than 1, the pixel density in a central region (ray direction from the directly opposite position) is higher, but where the value of P1 and P2 is lower than 1, the pixel density in a peripheral region (ray direction from an oblique horizontal direction) is higher. Either the panorama image generation apparatus 700 determines parameters P1 and P2, or the panorama image generation apparatus 700 receives parameters P1 and P2 designated by the head-mounted display unit 100 and generates an image of a transmission format in which the angular resolution is adjusted with desired parameters.

Generally, a transmission format in which a parameter function is used can be defined by defining a ray direction in which light of each pixel is directed to the point of view by a function which includes a parameter.

Now, a transmission format in which the angular resolution can be adjusted by designating a transmission pattern of pixels is described. The pixels X and Y are generated by multiplying ith and jth pixels upon transmission by a scale and an offset as X=Xscale×i+Xoffset and Y=Yscale×j+Yoffset. However, a pixel to be transmitted is omitted using a specific pattern. For example, in place of sending 1920 pixels from the first pixel to the 1920th pixel, from among 3000 pixels from the first pixel to the 3000th pixel, totaling 1920 pixels are transmitted to the head-mounted display unit 100 by transmitting only odd-numbered pixels from among the pixels from the first pixel to the 1080th pixel, transmitting all pixels from the 1081st pixel to the 1920th pixel and then transmitting only even-numbered pixels from among the pixels from the 1921st pixel to the 3000th pixel. This makes it possible to set the pixel density high in a central region of an image and set the pixel density low in a peripheral region of the image. If such a transmission format that a transmission pattern can be designated as a parameter as described above is used, it is possible to allow the panorama image generation apparatus 700 or the head-mounted display unit 100 to designate a transmission pattern to vary the angular resolution of an image.

Figure 9:
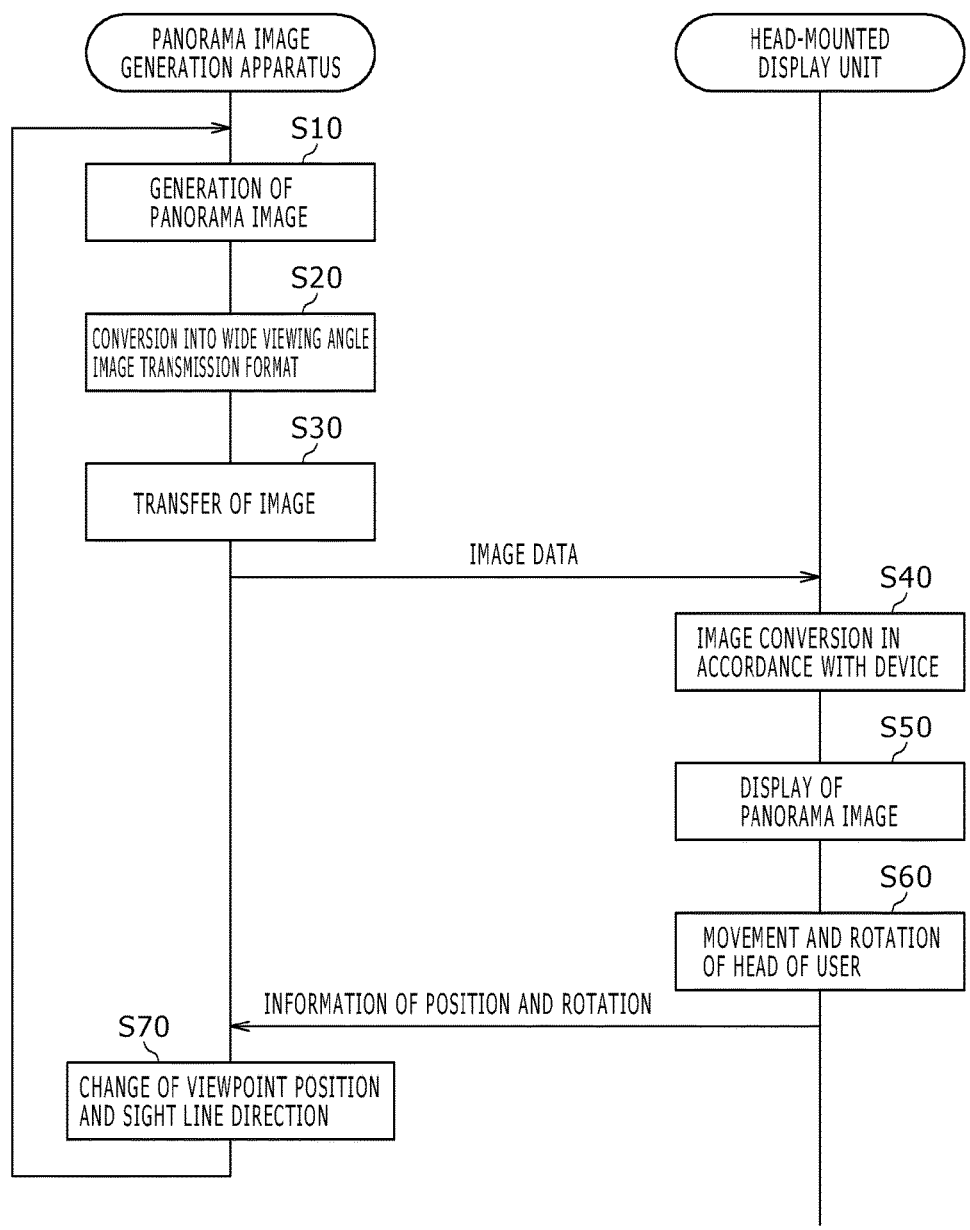
FIG. 9 is a sequence diagram illustrating a procedure of image generation and image transmission by the panorama image generation system of the present embodiment.

FIG. 9 is a sequence diagram illustrating a procedure of image generation and image transmission by the panorama image generation system of the present embodiment.

The panorama image processing unit 750 of the panorama image generation apparatus 700 generates a wide viewing angle image such as a panorama image to be displayed on the head-mounted display unit 100 (S10). This wide viewing angle image may be, for example, a panorama image actually captured by a camera or an artificial image rendered using computer graphics. The panorama image need not be an image whose angle of view in the horizontal direction exceeds 180 degrees but may be an image whose angle of view in the horizontal direction is equal to or smaller than 180 degrees. Also the angle of view in the vertical direction may exceed 180 degrees or may be equal to or smaller than 180 degrees.

The image conversion unit 780 converts the generated image into an image of the wide viewing angle image transmission format in which the angular resolution of the image is adjusted in response to the ray direction toward the point of view (S20).

While, in the foregoing description, the format of the image generated is converted into the wide viewing angle image transmission format once, also it is possible to directly generate an image of the wide viewing angle image transmission format by tracing the ray of light directed toward the point of view in the reverse direction using ray tracing to determine color information of each pixel directly by calculation. In this case, the configuration of the image conversion unit 780 is not required, and the panorama image processing unit 750 having a function of a ray tracing unit may generate an image of the wide viewing angle image transmission format.

The image provision unit 770 transfers the image of the wide viewing angle image transmission format to the head-mounted display unit 100 (S30).

The head-mounted display unit 100 receives the image of the wide viewing angle image transmission format, and the image conversion unit 90 converts the image in accordance with an optical characteristic unique to the head-mounted display unit 100 to convert the image into an image suitable for the display panel (S40). The output interface 30 displays the image after the conversion for the head-mounted display unit 100 on the display unit (S50).

If the user who wears the head-mounted display unit 100 moves or rotates the head, the GPS unit 60 or the motion sensor acquires information relating to the position of the head of the user and the posture sensor 64 acquires information relating to the rotation of the head (S60). The information relating to the position and the rotation is transmitted to the panorama image generation apparatus 700.

The coordinate transformation unit 740 of the panorama image generation apparatus 700 changes a viewpoint position and a sight line direction for viewing a panorama image from the acquired information relating to the position and the rotation of the head of the user (S70). The processing returns to step S10, at which the panorama image processing unit 750 generates a panorama image where the panorama image is viewed in the new sight line direction from the new viewpoint position. Thereafter, the processes at steps S20 to S70 are repeated.

Figure 10:
FIG. 10 is a view depicting an example of a panorama image generated by a panorama image processing unit of FIG. 4.

FIG. 10 is a view depicting an example of a panorama image generated by the panorama image processing unit 750. This example is an image whose angle of view in the horizontal direction is 180 degrees.

Figure 11:
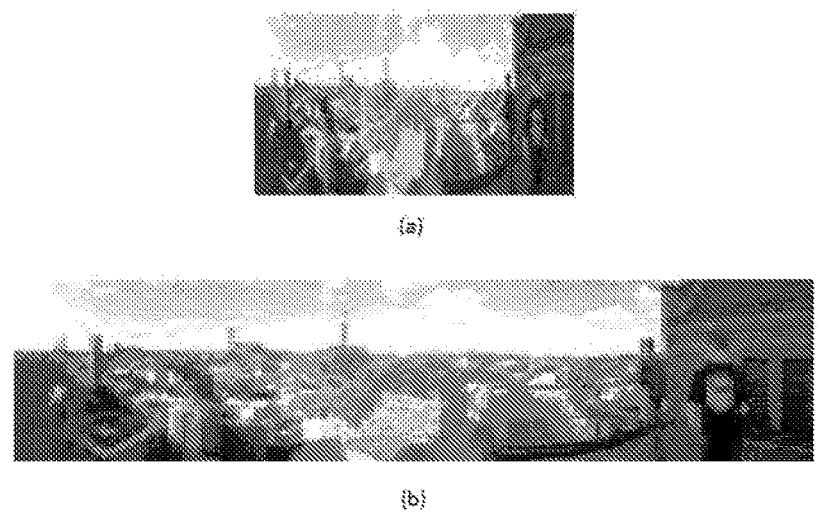
FIGS. 11(a) and 11(b) are views illustrating a case in which the panorama image of FIG. 10 is transferred in an ordinary transmission format to the head-mounted display unit and is reproduced by the head-mounted display unit for comparison.

FIGS. 11(*a*) and 11(*b*) are views illustrating a case in which the panorama image of FIG. 10 is transferred in an ordinary transmission format to the head-mounted display unit 100 and is reproduced by the head-mounted display unit 100 for comparison.

FIG. 11(*a*) illustrates a manner in which the panorama image of FIG. 10 is compressed by the ordinary transmission format. The image is compressed uniformly in a central region and a peripheral region thereof. If the image compressed by the ordinary transmission format in this manner is decompressed by and displayed on the head-mounted display unit 100, the overall image is blurred and the resolution in a central region of the image is deteriorated similarly to the resolution in a peripheral region of the image as depicted in FIG. 11(*b*).

Figure 12:
FIGS. 12(a) and 12(b) are views illustrating a case in which the panorama image of FIG. 10 is transferred in a wide viewing angle image transmission format of the present embodiment to the head-mounted display unit and is reproduced by the head-mounted display unit.
Figure 12:

FIGS. 12(*a*) and 12(*b*) are views illustrating another case in which the panorama image of FIG. 10 is transferred in the wide viewing angle image transmission format of the present embodiment to the head-mounted display unit and is reproduced on the head-mounted display unit.

FIG. 12(*a*) depicts the panorama image of FIG. 10 after this is converted into an image of a transmission format in which the angular resolution is adjusted so as to be uniform irrespective of the ray direction toward the point of view. The image is compressed such that the resolution in a central region of the image is higher than the resolution in a peripheral region of the image. If the image compressed by the transmission format of FIG. 12(*a*) is decompressed by and displayed on the head-mounted display unit 100, although the peripheral region is blurred in comparison with the central region, the central region is not blurred because the pixel density is high as depicted in FIG. 12(*b*). This is suitable for display on the head-mounted display unit 100.

As described above, according to the present embodiment, the image generation apparatus generates a wide viewing angle image in a common transmission format which does not rely upon an optical characteristic of each individual head-mounted display device and transmits the wide viewing angle image to the head-mounted display unit, and the head-mounted display unit converts the image in accordance with the optical characteristic thereof. Therefore, there is no necessity to generate an image in accordance with a characteristic of each individual head-mounted display device. Consequently, a generation process of a wide viewing angle image which does not rely upon the head-mounted display device can be implemented.

Further, by using the wide viewing angle image transmission format in which the angular resolution is adjusted in response to the ray direction toward the point of view, a wide viewing angle image suitable for any type of head-mounted display unit can be provided. Where a wide viewing angle image generated by the image generation apparatus in a conventional transmission format in which an entire image is compressed uniformly is transmitted to a head-mounted display unit, if the wide viewing angle image is displayed on the head-mounted display unit, the apparent picture quality is deteriorated in a central region of the image. However, with the present embodiment, since the angular resolution is adjusted in response to the ray direction toward the point of view, the resolution in a central region of an image can be made high in comparison with a peripheral region of the image, and deterioration of the picture quality in the central region of the image can be prevented.

The present invention has been described with reference to the embodiment. The embodiment is exemplary, and it can be recognized by those skilled in the art that various modifications can be made in the combination of the components and the processes and that also such modifications remain within the scope of the present invention. Such a modification is described.

While, in the foregoing description, the embodiment in which a wide viewing angle image is displayed on a head-mounted display unit is described, also where a wide viewing angle image is displayed on a display unit of the ordinary desk-top type or wall-mounted type which is not mounted on the head, the image generation method of the present embodiment may be applied to convert the format of an image into a format in which the angular resolution of the image is suitable for a characteristic of the eyes of a human being. The technology for adjusting the angular resolution in response to the ray direction toward the point of view is effective also where a panorama image is displayed on a horizontally-elongated or vertically-elongated display unit.

REFERENCE SIGNS LIST

10 Control unit, 20 Input interface, 30 Output interface, 32 Backlight, 40 Communication controlling unit, 42 Network adapter, 44 Antenna, 50 Storage unit, 60 GPS unit, 62 Wireless unit, 64 Posture sensor, 70 External input/output terminal interface, 72 External memory, 80 Clock unit, 90 Image conversion unit, 100 Head-mounted display unit, 110 Main body unit, 120 Front head portion contact unit, 130 Side head portion contact unit, 200 Game machine, 700 Panorama image generation apparatus, 710 Zoom instruction acquisition unit, 720 Sensitivity adjustment unit, 730 Position and rotation information acquisition unit, 740 Coordinate transformation unit, 750 Panorama image processing unit, 760 Panorama image storage unit, 770 Image provision unit, 780 Image conversion unit.

INDUSTRIAL APPLICABILITY

The invention can be applied to a technology by which a wide viewing angle image is generated.

The invention claimed is:
1. An image generation apparatus comprising:
a coordinate transformation unit configured to update a viewpoint position and a sight line direction of a user from information of a position and rotation of the head of the user acquired from a head-mounted display unit and perform coordinate transformation for generating an image of a wide viewing angle to be displayed on the head-mounted display unit;
an image generation unit configured to generate an image of a wide viewing angle which is seen in the updated sight line direction from the updated viewpoint position and is to be transmitted to the head-mounted display unit in accordance with the coordinate transformation by the coordinate transformation unit; and
an image conversion unit configured to convert the generated image into an image of a transmission format in which an angular resolution which is a number of pixels per unit angle centered at the point of view is adjusted in response to a ray direction toward the point of view.

2. The image generation apparatus according to claim 1, wherein the image conversion unit converts the generated image into an image of a transmission format in which the angular resolution is adjusted so as to be uniform irrespective of the ray direction toward the point of view.

3. The image generation apparatus according to claim 1, wherein the image conversion unit converts the generated image into an image of a transmission format in which the angular resolution is adjusted such that the angular resolution in a ray direction from an opposite position toward the point of view is higher than the angular resolution in a ray direction from an oblique position toward the point of view.

4. The image generation apparatus according to claim 1, wherein the transmission format includes a variable parameter which is capable of adjusting the angular resolution in accordance with the ray direction toward the point of view.

5. The image generation apparatus according to claim 1, wherein the generated image is an image of a wide viewing angle to be transmitted to the head-mounted display unit, and the transmission format is a common format which does not rely upon an optical characteristic of each individual head-mounted display unit.

6. An image generation apparatus comprising:
a coordinate transformation unit configured to update a viewpoint position and a sight line direction of a user from information of a position and rotation of the head of the user acquired from a head-mounted display unit and perform coordinate transformation for generating an image of a wide viewing angle to be displayed on the head-mounted display unit; and
a ray tracing unit configured to trace, in a reverse direction, a ray of light directed toward the updated viewpoint position to render an image of a wide viewing angle which is seen in the updated sight line direction from the updated viewpoint position and is to be transmitted to the head-mounted display unit in accordance with the coordinate transformation by the coordinate transformation unit;
the ray tracing unit generating an image in a transmission format in which an angular resolution which is a number of pixels per unit angle centered at the point of view is adjusted in response to a ray direction toward the point of view.

7. An image generation method comprising:
updating a viewpoint position and a sight line direction of a user from information of a position and rotation of the head of the user acquired from a head-mounted display unit and performing coordinate transformation for generating an image of a wide viewing angle to be displayed on the head-mounted display unit;
generating an image of a wide viewing angle which is seen in the updated sight line direction from the updated viewpoint position and is to be transmitted to the head-mounted display unit in accordance with the coordinate transformation by the performing coordinate transformation; and converting the generated image into an image of a transmission format in which an angular resolution which is a number of pixels per unit angle centered at the point of view is adjusted in response to a ray direction toward the point of view.

8. An image generation method comprising:

updating a viewpoint position and a sight line direction of a user from information of a position and rotation of the head of the user acquired from a head-mounted display unit and performing coordinate transformation for generating an image of a wide viewing angle to be displayed on the head-mounted display unit; and tracing, in a reverse direction, a ray of light entering the updated viewpoint position to render an image of a wide viewing angle which is seen in the updated sight line direction from the updated viewpoint position and is to be transmitted to the head-mounted display unit in accordance with the coordinate transformation by the performing coordinate transformation;

the ray tracing generating an image in a transmission format in which an angular resolution which is a number of pixels per unit angle centered at the point of view is adjusted in response to a ray direction toward the point of view.

* * * * *